(No Model.)
T. M. BOWERS.
PLOW.
No. 560,466. Patented May 19, 1896.
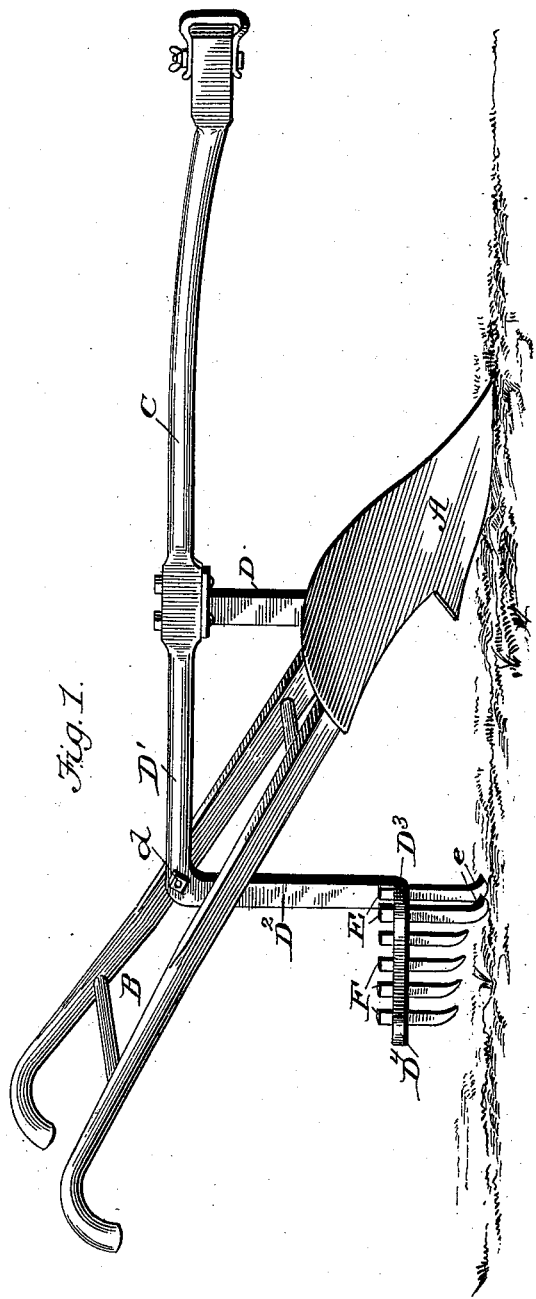
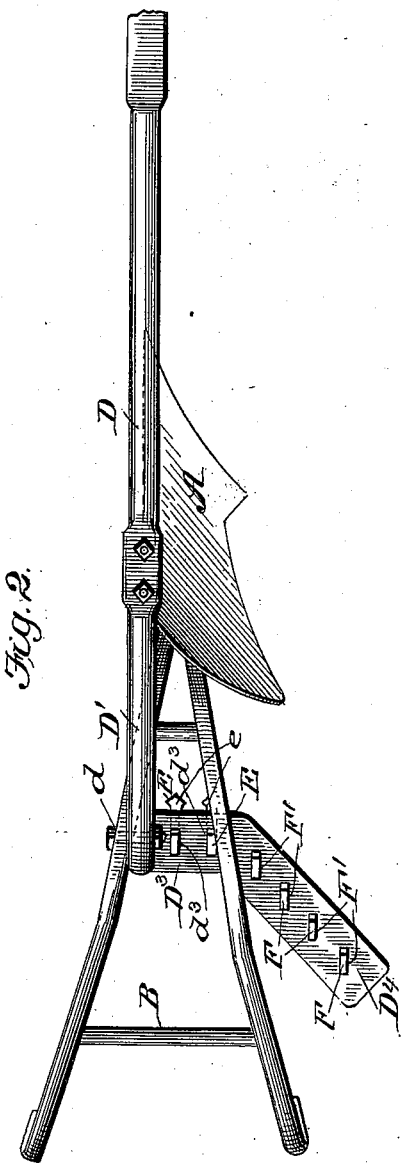
WITNESSES:
Jos. A. Ryan
P. B. Turpin
INVENTOR
Thomas M. Bowers
BY Munn & Co.
ATTORNEYS.

ated underground drains which will in wet
UNITED STATES PATENT OFFICE.

THOMAS M. BOWERS, OF CROCKETT, TEXAS.

PLOW.

SPECIFICATION forming part of Letters Patent No. 560,466, dated May 19, 1896.

Application filed February 6, 1896. Serial No. 578,187. (No model.)

*To all whom it may concern:*

Be it known that I, THOMAS M. BOWERS, of Crockett, in the county of Houston and State of Texas, have invented a new and useful Improvement in Plows, of which the following is a specification.

My invention is an improvement in plows, and has for an object to provide a novel construction of subsoil and harrow attachment to the ordinary break-plow; and the invention consists in certain novel constructions and combinations of parts, as will be hereinafter described, and pointed out in the claims.

In the drawings, Figure 1 is a side view, and Fig. 2 a top plan view, of a plow embodying my improvements.

The share A and handles B may be of ordinary construction. The beam C, to which the standard D is fixed, extends rearwardly beyond the standard, has such rear extension D' bolted at $d$ to one of the handles, and is provided with a vertically-depending portion $D^2$, at the lower end of which is provided the lateral portion, having wings $D^3$ and $D^4$, the former extending at right angles to the path of the plow and the latter inclining rearwardly from the outer end of the wing $D^3$. The beam with its extension D' and portions $D^2$, $D^3$, and $D^4$ may be integral and may be formed of cast or wrought iron or other suitable material. The wing $D^3$ is provided with openings $d^3$ for the subsoiling-teeth E, and the wing $D^4$ has openings F' for the harrow-teeth F.

The harrow-teeth are made of different lengths, gradually decreasing in length toward the outer end of the wing $D^4$. The subsoil-teeth E are made larger and longer than the teeth F and have at their lower ends toe portions $e$, which widen out and tend to create underground drains which will in wet weather carry off the surplus water and in dry weather will retain the moisture.

The beam with the subsoiling and harrow teeth supports, being in one piece, may be quickly and conveniently applied and will be firm and strong in use. The advantage of subsoiling and harrowing is too well known to require detail reference, and by supporting and arranging the harrowing and subsoiling devices as shown the draft upon the plow is but slightly increased as compared with the great advantage gained.

Having thus described my invention, what I claim as new, and desire to secure by Letters Patent, is—

1. A plow-beam having integral therewith the downwardly-bent portion and the lateral portion at the lower end thereof provided with teeth substantially as described.

2. A plow-beam provided in rear of the standard with a downwardly-bent portion having at its lower end a lateral portion forming a support for the teeth substantially as shown and described.

3. The plow herein described composed of the share the standard the handles, the beam fixed to the standard and having a rear extension secured to one of the handles, a downwardly-extending portion and a lateral portion at the lower end of said downwardly-extending portion and the teeth substantially as shown and described.

THOMAS M. BOWERS.

Witnesses:
WILLIAM HENRY BAILEY, Sr.,
VIVIAN TREZEVANT.